Feb. 7, 1939. C. B. BEASLEY Re. 20,995

REEL

Original Filed April 11, 1935 2 Sheets-Sheet 1

Inventor

C. B. Beasley

By Clarence A. O'Brien

Attorney

Feb. 7, 1939. C. B. BEASLEY Re. 20,995

REEL

Original Filed April 11, 1935 2 Sheets-Sheet 2

Inventor

C. B. Beasley

By Clarence O'Brien

Attorney

Reissued Feb. 7, 1939

Re. 20,995

UNITED STATES PATENT OFFICE 20,995

REEL

Charles Black Beasley, Great Lakes, Ill.

Original No. 2,026,665, dated January 7, 1936, Serial No. 15,897, April 11, 1935. Application for reissue December 11, 1936, Serial No. 115,358

14 Claims. (Cl. 242—84.3)

This invention relates to fishing reels and has as its object the provision of such a reel wherein the reel on which the line is wound is spring actuated to take up the slack therein together with brake means for arresting the rotary movement of the reel; means for releasing the reel to permit the same to run free of the spring, when desired, and manual means for rotating the reel or spool to wind the line thereon.

The invention together with its objects and advantages will be best understood from a study of the following description taken in connection with the accompanying drawings wherein:

Figure 4 is a fragmentary plan view of the control levers hereinafter more fully referred to.

Figure 1:
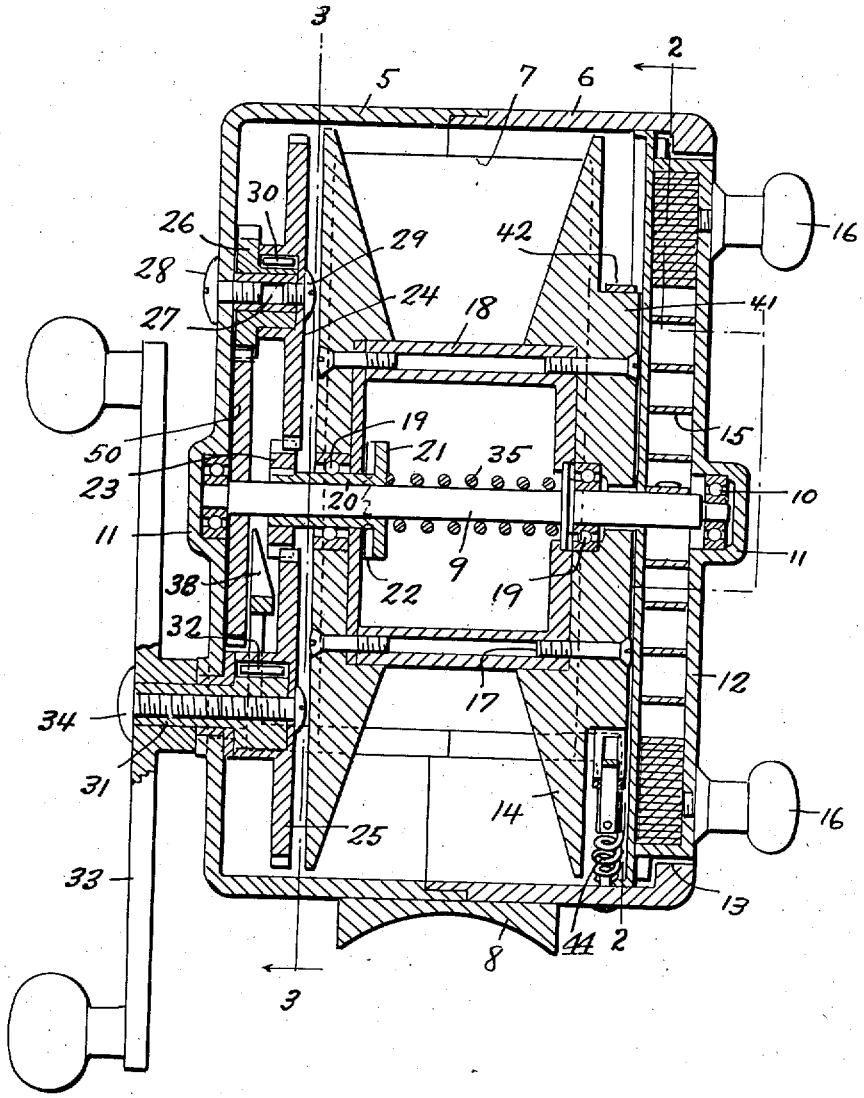
Figure 1 is an enlarged sectional view through the reel.

By referring to the drawings by reference numerals it will be seen that the reel comprises a pair of complemental casing sections 5 and 6 respectively which at their joined edges are suitably formed to provide an opening 7 through which the line operates. The casing is mounted on a suitable base 8 which may be attached to a fishing rod or other suitable support.

A reel shaft 9 is provided, having ends journaled in bearings 10 mounted in suitable pockets 11 formed in the casing section 5 and the circular spring housing 12. The circular spring housing 12 operates within an opening 13, provided therefor in the end wall of the casing section 6.

Figure 2:
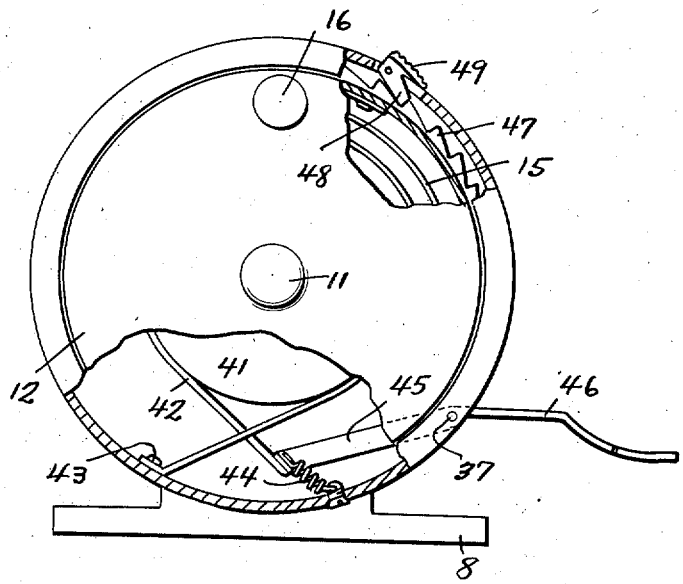
Figure 2 is a detail view taken substantially on the line 2—2 of Figure 1.

For normally urging the shaft 9 in one direction for winding the fishing line onto the reel or spool 14 there is suitably housed within the casing 12 a spring 15 secured at one end to the housing and at the other end to the shaft 9 as clearly shown in Figures 1 and 2. For rotating the housing 12 there are provided suitable knobs or handles 16.

The drum or reel 14 is mounted on the shaft 9 to rotate relative thereto and includes a pair of flanges secured by bolts 17 to a hub 18. Provided in the flanges are suitable bearings 19 which accommodate the shaft 9 as clearly shown in Figure 1.

Slidable on the shaft 9, is a clutch member comprising a hub 20, provided at one end with a toothed element 21 adapted to cooperate with teeth on the hub 18. As clearly shown at 22 in Figure 1, the cooperating clutch teeth on the hub and the clutch member are formed of saw-tooth configuration so that the clutch may drive the drum or reel in the winding direction and the reel may drive the clutch in the reverse or unwinding direction, while at the same time, the reel or drum may override and slip past the clutch in the winding direction. Also fixed to the hub 20 of the clutching member is a pinion 23 which is adapted to mesh with gears 24 and 25. As shown in Figure 1, pinion 23, is sufficiently wide to permit the necessary sliding movement of the clutching element on the shaft 9, while maintaining the desired meshing relationship with the gears 24 and 25.

For supporting the gear 24 and a pinion gear 26 there is provided a tubular stub shaft 27 secured by a screw 28 to the end wall of the casing section 5, and the gears 24 and 26 are retained in place on the shaft 27 through the medium of a screw 29. Gears 24 and 26 as shown, have hub portions arranged in concentric relation and are suitably formed to accommodate a clutch such as the roller clutch 30, so that upon rotation of the gear 26 in one direction, it will cause, through the action of the clutch 30, a corresponding rotation of the gear 24, while a reverse rotation of the gear 24 will result in an interruption of the drive connection between the gears 24 and 26 whereby no driving relation is maintained therebetween for driving gear 26 from gear 24. However, as will be apparent from an inspection of the clutch 30 in Figure 3, the relationship is reversed when the drive is imparted from gear 26 to gear 24. It will thus be seen that gear 26 can drive gear 24 in that direction which will cause a winding of the reel but cannot drive gear 24 in the reverse direction or that direction which serves through the clutching member, to unwind the reel. On the other hand, gear 24 can drive gear 26 when the reel is unwinding and yet cannot drive gear 26 when rotating in the direction incident to the winding of the reel. The value of this construction is believed to be apparent.

For the gear 25 there is provided a suitable shaft 31 suitably formed in the region of the hub of the gear 25 to accommodate a similar roller clutch 32, through the medium of which the shaft 31 may be connected to drive the gear 25 in one direction of rotation, namely, that direction which will cause a winding of the drum or reel. On the outer end of the shaft 31 there is provided a suitable handle 33, and said handle and gear 25 are properly retained on the shaft 31 through the medium of suitable bolt means 34.

It will thus be apparent that the action of the clutches 30 and 32 respectively, is such that the reel may be wound by the handle 33 without imparting rotation to the gear 26 as the clutch 30 will slip when the gear 24 attempts to drive gear 26 in the direction of rotation incident to the winding of the drum. On the other hand, when the drive of the reel or drum in the winding direction is imparted through the gears 50, 26, 24 and 23 and the clutch member, the gear 25 will override and slip past the shaft 31 without imparting the corresponding rotation to the handle 33.

Figure 3:
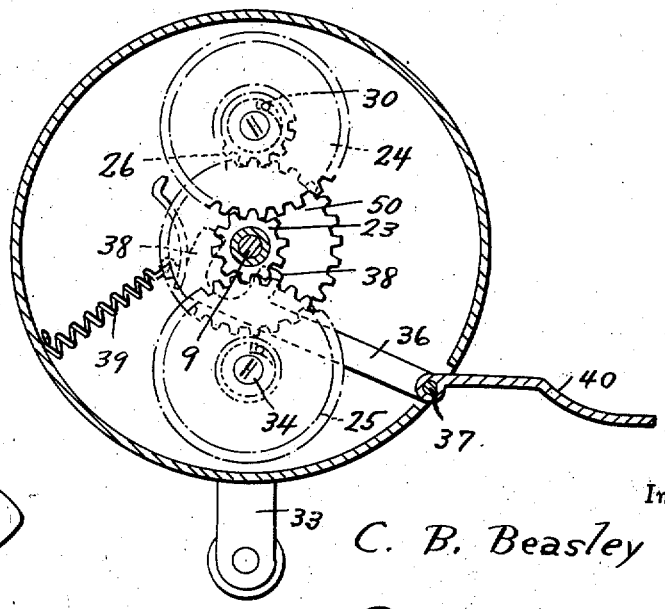
Figure 3 is an enlarged detail view taken substantially on the line 3—3 of Figure 1.

The clutch member 21 is normally engaged with the teeth of the reel hub 18 as at 22 through the medium of a suitably located coil spring 35 arranged within the hub. For shifting the clutch member 21 out of engagement with the reel against the action of spring 35 there is provided a lever 36 pivoted at one end as at 37 and equipped adjacent its other end with a wedge 38 that is adapted to engage one side of the pinion 23 when the lever 36, as seen in Figure 3, is caused to swing in a clockwise direction and thereby force the clutching member to the right, in Figure 1, to release or place the clutching member out of driving engagement with the hub 18. The lever 36 is normally urged to a released or normal position through the medium of a suitably anchored spring 39, and a handle for the lever 36 is provided and indicated generally by the reference numeral 40.

As illustrated in Figure 3, the lever 36 has mounted adjacent the end thereof, a holding finger 38' which extends upwardly and is provided at its end with a holding tooth which is so disposed that it will engage between certain of the gear teeth of gear 24, when the clutching member is disengaged as above described. In other words, when the handle 40 for the lever is depressed so as to elevate the lever 36 and cause the disengagement of the clutch, at the moment the clutch becomes disengaged the holding finger 38' will have already been placed in holding engagement with certain of the gear teeth of the gear 24. Thus, if the spring 15 is under tension and is exerting a force throughout the gear train on the gear 24, this force is resisted by holding finger 38' when the clutch is out of engagement and by the brake hereinafter described, acting on the drum or reel, when the clutch is in engagement.

Figure 4:
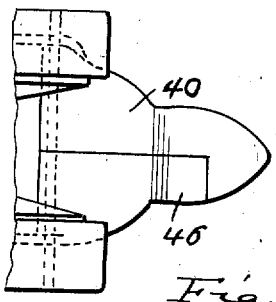

On one end thereof the reel 14 is formed to provide a brake drum 41 about which is trained a brake band 42 the ends of which are crossed as shown in Figure 2, one of said ends being bifurcated to accommodate the other end, as shown in Figure 1. The bifurcated end of the brake band 42 is anchored as at 43 while the other end of the band is connected with one end of a suitably anchored spring 44. This last named end of the band is also secured to one end of a brake operating lever 45 pivotally supported by the pivot 37 and equipped with a handle 46. As best shown in Figure 4, handle 40 is suitably notched to accommodate the handle 46.

To releasably retain the spring enclosing shell or housing 12 against retrograde movement, the latter, on its periphery is provided with a circular series of ratchet teeth 47 with which is engaged the dog 48 suitably mounted on the periphery of the casing section 6 and equipped with a finger piece 49 all of which is best shown in Figure 2. From an inspection of this figure, it will be apparent that the dog 48 will serve to hold the spring shell under ordinary circumstances but that the same may be moved by manipulating the finger piece 49 with the result that the spring shell will be free to turn. Thus, if the spring is wound and it should be desired to unwind the spring without effecting the drum or reel or other parts of the mechanism, this can be readily accomplished by manipulating the finger piece 49 so as to permit the spring to expend its energy by movement of its outer end, which acts to turn the shell. This construction provides a spring which can be wound or discharged from either end so that when the outside is held by the shell, the spring can be wound or discharged through the action of the shaft 9 or vice versa when the shaft 9 is held, the spring can be wound or discharged through the action of the enclosing shell 12.

The operation of the reel may be briefly described as follows: In its normal position, the clutch member 21 is engaged with the hub 18 of theh reel as at 22 so that the spring 15 will control the winding of the spool and in this connection it will be apparent that to wind the spring the casinhg 12 is rotated in a clockwise direction, the ratchet teeth 47 and dog 48 preventing retrograde movement of the spring and spring shell. With the spring thus cocked or loaded the operator by manipulating the handle 40 forces the legs 38 of the clutch fork or lever 36 upwardly into lateral engagement with the pinion 23 moving said pinion, hub 20, and clutch member 21 inwardly against the action of spring 35. At the same time, the holding finger 38' is caused to engage between certain of the teeth of the gear 24 so as to hold the gears 24, 26, and 50 together with shaft 9 against unwanted rotation such as would otherwise release the stored energy of the wound spring. With the clutch released as above described, it will be seen that the reel is free of driving engagement with the shaft 9 and may, when the brake is off, freely rotate about the shaft 9 as an axis, for casting purposes. Rotation of the reel 14, when casting, is controlled or retarded by the operator pressing on or releasing the lever 46 to thereby release or frictionally engage the brake band 42 with the brake drum 41; it being understood that spring 44 tends to hold the brake band 42 engaged with the drum 41 for applying a braking action to the reel while the lever 46 is manipulated to release the drum 41 of the reel.

After the casting operation the lever 40 is released for permitting the clutch fork under action of spring 39 to return to its normal position and the clutch member 21 under the action of the spring 35 to engage the reel as at 22 to place the reel through the instrumentality of the intermediate gears, in driving engagement with the shaft 9.

Upon restoring the clutching element to its clutched or engaged position with the reel or drum, the spring finger 38' is released from its holding engagement with the teeth of gear 24 and thus the tension of the spring is imparted through the intermediate gears and clutch member to the drum to be controlled thereby through the line of the reel or the brake, as the case may be. When the reel is placed in driving engagement with the shaft 9, through the instrumentality of the gears, the spring 15 will act to yieldably urge the reel to rotate in a direction to take up any slack in the line. In this connection, it will be understood that the drive of the reel from the spring 15, will be through the shaft 9, gear 50 fixed on said shaft and engaging the pinion 26, which through the medium of the clutch 30 is in driving engagement with the gear 24, that in turn is in mesh with the pinion 23, so that with the clutch 21 engaged with the hub 18 of the reel as at 22 the drive is transmitted from the shaft through the rain of gearing just described and the clutch 21 to the reel.

It will be further apparent that when the spring 15 is acting to yieldably urge the reel to rotate in a direction to take up any slack in the line that if the line should be pulled out, as by the running of a fish thereon, that a winding action will be imparted through the clutch and gearing to the shaft 9 so as to wind or energize the spring 15. If such winding action should become too great, damage to the spring can be avoided by releasing the clutch 21, by depressing the lever 40, or if desired, by releasing the finger piece 49, but under normal conditions such winding of the spring will be only sufficient to automatically draw in the line which has been run out by the action of the fish.

When it is desired to manually wind the line on the spool 14, clutch 21 is engaged with the hub 18 of the spool as at 22 and the operator then turns the handle 33 which through the clutch 32 drives the gear 25 that is in mesh with the pinion 23. Obviously, with clutch 21 engaged as just stated, the reel 18 will then be caused to rotate about the shaft 9 as an axis for winding the line on the spool 14, and in this connection it will be noted that the gear 24 under such circumstances will run idle so that no drive will be imparted to the shaft 9 and consequently the spring 15 will not be disturbed by this manual winding of the line on the spool.

It will further be observed that the clutch 32 acts in such a manner that the winding in action of the reel as effected by the spring 15 will not cause the handle 33 to undergo a corresponding rotation but will allow the handle to remain at rest, and thus there is no liability of the handle striking the hand of the operator. When the spool is wound manually through the handle 33, the winding action of the reel or drum will permit a corresponding degree of unwinding of the spring 15, if the same should be wound.

It will be further noted that the clutch member is normally engaged and that the brake is normally "on", and that the clutch and brake are manually released rather than applied and that this characteristic makes for simple and accurate control of the operation of the reel.

It will be further noted that the brake acts directly on the spool and thus provides a direct control over the spool which gives a more positive and desirable control of the reel in operation.

The construction of the clutch member is such that in the winding direction the reel is free to overrun the clutch such as might be occasioned by the inertia of the reel after a sudden "winding-in" action. This eliminates the danger of any tendency to reversely winding the spring or to impart a sudden breaking or snapping action thereto.

The holding dog 48 which holds the spring and closing shell 12 against retrograde movement further serves as a factor for eliminating accidental breakage of the spring and the tendency to reverse the winding of the spring under the inertia of the sudden "winding-in" action of the reel or drum. This is because the tendency to reverse the winding of the spring 15 would result in a rotation of the spring element as a unit and a ratcheting of the spring shell with relation to the dog 48 will result before the spring will be broken under such tendency. This feature, with the clutch 30 and the overriding feature of the clutch member 21 provide three safety factors which prevent the transmission of breaking strains to the spring.

Another important advantage is that the spring can always be additionally tensioned through the action of the knobs 16 even though the reel is in action. If the spring is becoming exhausted during the process of winding in the reel the operator can, through the winding of the knobs 16, further charge the spring 15 and thus prolong the action of the spring to any extent desired.

I claim:

1. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line.

2. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft.

3. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft, and brake means for retarding rotative movement of the reel.

4. In a fishing reel the combination of a line spool, a shaft on which said spool is mounted, a spring adapted when unwinding to rotate said spool in a direction to draw in the line, said spring having one end secured to said shaft, a sleeve slidably mounted on said shaft, interengaging clutch means on said spool and one end of said sleeve for placing said sleeve and spool in driving engagement one with the other, a spring device yieldably retaining said interengaging clutch means engaged, a pinion on the end of the sleeve remote from said clutch means, a gear fixed on one end of said shaft, a fixed shaft, a gear on the fixed shaft in mesh with said pinion, a pinion on the fixed shaft in mesh with the gear on the first shaft, and cam slot and roller clutch means for placing the gear on the fixed shaft in driven engagement with the pinion on the fixed shaft upon rotation of the gear on the fixed shaft in one direction for transmitting drive from the first shaft to the reel for rotating said reel in a direction to draw in the line, a hand crank, a shaft to which said hand crank is secured, a gear on the hand crankshaft in mesh with the first named pinion for transmitting drive from the hand crank to the reel for rotating the reel relative to the first named shaft, brake means for retarding rotative movement of the reel, and a clutch shifting fork for actuating said clutch means to place said reel out of driven engagement with the first named shaft to permit the reel to rotate free and independently of the first named shaft.

5. A reel of the character described comprising in combination a spool, a manually operable braking means acting directly upon said spool, a power spring and a winding means for said power spring connected to one end thereof, means for driving said spool connected to the other end of said power spring, said last named means including a manually operable clutch for connecting and disconnecting said spool to and from said spring and also including an automatic one-way clutch.

6. A reel of the character described comprising in combination, a spool, a power spring and a winding means for said power spring connected to one end thereof, means for driving said spool connected to the other end of said power spring, said last named means including a manually operable clutch for connecting and disconnecting said spool to and from said spring and also including an automatic one-way clutch, a hand crank for rotating said spool and connected to said driving means and having an automatic one-way clutch therebetween.

7. A reel of the character described comprising in combination a spool, a power spring, and a winding means for said power spring connected to one end thereof, means for driving said spool connected to the other end of said power spring, said last named means including a manually operable clutch for connecting and disconnecting said spool to and from said spring and a member operable with said clutch for holding said spool driving means against rotation when said clutch is disengaged.

8. A reel of the character described comprising in combination a spool, a power spring and a winding means for said power spring connected to one end thereof, means for driving said spool connected to the other end of said power spring, said last named means including a manually operable clutch for connecting and disconnecting said spool to and from said spring and also including an automatic one-way clutch; a hand crank for rotating said spool and connected to said driving means and having an automatic one-way clutch therebetween, said first and second named automatic clutches being so constructed and arranged that when one is connected incident to winding said spool, the resulting motion is not transmitted to the other.

9. A reel of the character described comprising in combination a spool, a brake for holding said spool, a power spring, and winding means for said power spring connected to one end thereof and means for driving said spool connected to the other end thereof, said last named means including a manually operable clutch for connecting and disconnecting said spool to and from said spring and also including an automatic one-way clutch.

10. A reel of the character described comprising in combination a spool, manual means for winding said spool, a power spring, means for winding said power spring and means for connecting said power spring to said spool, said last named means including a clutch having means for normally urging said clutch in a position to connect said power means to said spool and manual means operable to disengage said clutch.

11. A reel of the character described comprising in combination a spool, manual means for winding said spool, a power spring, means for winding said power spring, driving means for connecting said spool respectively, to said power spring and to said manual means, said last named means including a clutch and means normally urging said clutch into engaged position and manually operable means for disengaging said clutch.

12. A reel of the character described comprising a spool, a frame having portions disposed adjacent the opposite ends of said spool, a crank for manually rotating said spool mounted in said frame adjacent one end of said spool, and a power spring connected to drive said spool mounted in the frame adjacent the other end of said spool, said power spring having manually operable winding means associated therewith and disposed at the end of said reel opposite said crank.

13. A reel of the character described comprising in combination a spool, a power spring and a winding means for said power spring connected to one end thereof, means for driving said spool connected to the other end of said power spring, said last named means including a manually operable clutch for connecting and disconnecting said spool to and from said spring and also including an automatic one-way clutch and a manually operable brake adapted to hold said reel against rotation by said power spring.

14. A reel of the character described comprising in combination, a spool, a brake for holding said spool, a power spring and winding means for said power spring connected to one end thereof, means for driving said spool connected to the other end of said power spring, said last named means including a manually operable clutch for connecting and disconnecting said spool to and from said spring and also including an automatic one-way clutch, a hand crank for rotating said spool and connected to said driving means and having an automatic one way clutch therebetween.

CHARLES BLACK BEASLEY.